3,023,233
PROCESS FOR MAKING TRICARBOXYCYCLO-PENTANEACETIC ACID

Allison Maggiolo, Merion, and Anthony L. Tumolo, Philadelphia, Pa., assignors to W. R. Grace & Co., New York, N.Y., a corporation of Connecticut
No Drawing. Filed June 3, 1958, Ser. No. 739,476
9 Claims. (Cl. 260—514)

The present invention relates to a novel process of preparing a tetrabasic acid.

Summarily the invention comprises subjecting dicyclopentadiene to the action of ozone in the respective mole ratio of 1:about 2 at a temperature of 10–45° C. in a medium comprising a carboxylic acid and thereafter oxidizing the ozonized product with hydrogen peroxide in the presence of an acid at least as strong as formic acid to obtain 2,3,5-tricarboxycyclopentaneacetic acid, in accordance with the following equation:

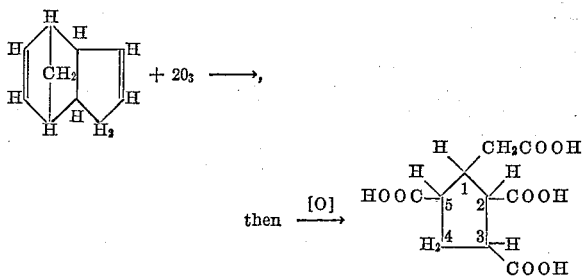

Neither the tetrabasic acid nor its esters are new products, having been disclosed by C.K. Ingold et al., J. Chem. Soc., 1936, 142–153. However, the prior art process for making the acid is impractical for commercial application, requiring intermediates that are not as yet commercially available. The instant process uses raw materials that are cheap and readily available.

The following examples will aid in describing but are not to limit, the invention.

Example 1

The apparatus used was a counter-current sieve plate column with 15 plates, 24 inches high by 1 inch inside diameter, fitted with customary inlet means for liquid addition at the top and on the 4th, 8th, and 12th plates, for gas at the bottom, and for collecting product at the bottom. The column was fitted with a water jacket through which tap water was circulated to permit ready control of the exothermic reaction.

Ozone was introduced continuously as a 1.6% by volume concentration in oxygen, as produced in a conventional ozonizer.

The dicyclopentadiene was introduced continuously as a solution in acetic acid on the 8th plate from the bottom, and additional acetic acid was added continuously at the top to provide enough solvent to prevent the reaction products from precipitating and to scrub volatilized dicyclopentadiene from the gas stream.

Using the above-described column reactor and procedure, a 200 ml. solution of 43.6 g. of dicyclopentadiene in glacial acetic acid was subjected to the action of 30 g. of ozone (about 95% of theory) over a period of about 214 minutes, during which time acetic acid (about 800 ml. total) was added continuously at the top of the column. The reaction temperature was maintained in the range of 14–24° C. The reaction product (about 1 liter) was collected and transferred to a two-liter three-neck flask equipped with reflux condenser, thermometer, dropping funnel, and mechanical stirrer. Over a 35-minute period an oxidizing solution containing 50 ml. of 50% $H_2O_2$, 10 ml. $H_2SO_4$, and 150 ml. water was added with stirring. The resultant solution was then gradually heated with stirring to 50° C. over a 45-minute period, after which the temperature rose spontaneously to about 62° C. and remained at approximately this temperature for 2 hours.

The solution at this point contains tricarboxycyclopentaneacetic acid in good yield and purity, and if desired the product can be readily recovered by ion exchange removal of the sulfate ion followed by evaporation of the acetic acid and water under reduced pressure. (The removal of sulfate ions from aqueous solutions by ion exchange is a well-known technique and requires no elaboration here.) The product so obtained contains small amounts of carbonyl groups. If a purer product is desired, the solution may be treated with further portions of acidified $H_2O_2$ to make the oxidation more nearly complete, as follows:

Two 25 ml. portions of 50% $H_2O_2$ were added to the one-liter solution of acid product made as above described, and the temperature maintained in the range of 55° to 60° C. for an additional 8 hours. The solution was allowed to stand overnight. The following day 30 ml. of 50% $H_2O_2$ and 0.25 g. of $FeSO_4$ were added and the solution was refluxed at 110° C. for 3 hours. The $FeSO_4$ was used as a catalyst to decompose any residual active oxygen substances. On analysis, no active oxygen and only a small carbonyl value was found. The solvents were removed under vacuum leaving a light brown solid residue. After further drying at 70° C. in a vacuum oven, the net weight of 2,3,5-tricarboxylic cyclopentaneacetic acid product was 71 g., equal to 82.5% of theory.

For good results the reaction medium should comprise, as an essential component, a carboxylic acid, preferably an alkanoic acid, e.g., formic, acetic, propionic, butyric, valeric, caproic, heptanoic, caprylic, pelargonic, capric, and the like, including mixtures of these. If desired, additional inert liquids, e.g., esters, such as ethyl acetate, or even water, may be included with the carboxylic acid or acids. In this connection, a medium comprising formic acid represents a preferred embodiment of the invention, since this acid is sufficiently strong to serve also as the acid in the oxidation step (with hydrogen peroxide) without the further addition of other acid (such as sulfuric acid or the like).

The oxidation temperature is not critical. It proceeds, although slowly, even at room temperature. Preferably it is carried out at somewhat higher temperature, e.g., 50° C. and higher, suitably 50°–103° C. Reflux conditions are convenient and suitable.

The concentration of the $H_2O_2$ is not critical, concentrations other than 50% being suitable, e.g., 25–70%.

The rate of flow of liquid and gas in the foregoing example is not critical, but is preferably adjusted to provide good foam-free liquid-gas contact in the apparatus selected. Actually, the reaction can be carried out in any apparatus admitting of gas-liquid contact, including a simple batch reaction vessel, as shown in the next example.

Example 2

In a reaction vessel comprising a two-liter resin kettle fitted with mechanical stirrer, thermometer, reflux condenser, and gas inlet tube, a solution of 38.2 g. of dicyclopentadiene (.289 mols) in 200 ml. of ethyl acetate and 380 ml. of formic acid was treated at 10° C. with about 28 g. ozone (as 2% mixture in oxygen), or approximately 2 moles of ozone per mole of dicyclopentadiene. The ozonated solution was then oxidized by adding to the reaction vessel a solution of 20 ml. of 50% $H_2O_2$ in 600 ml. of water. After refluxing for three and a half hours, an additional 10 ml. of 50% $H_2O_2$ was added and reflux continued for four additional hours. Thereafter the ethyl acetate was distilled off to raise the reflux temperature, and two 30 ml. portions of 50% $H_2O_2$ were added. Reflux was continued for 7 additional hours, after which the solvent was removed by vacuum. A very good yield of crude 2,3,5-tricarboxycyclopentaneacetic acid was obtained.

The mode of oxidation appears fairly critical if a good yield of product is to be obtained, fairly free of carbonyl-containing byproducts. In this connection it may be noted that most of the usual ozonide oxidation processes give products containing excessive amounts of carbonyl groups. Among such inadequate oxidation procedures may be mentioned the use of oxygen alone, oxygen with traces of ozone, and hydrogen peroxide in acetic acid. Accordingly, if a part of the oxidation is carried out in one of the above procedures, it should be supplemented with further oxidation using hydrogen peroxide in the presence of an acid at least as strong as formic acid, i.e., having an ionization constant of at least $2.4 \times 10^{-4}$. Suitable acids include formic, sulfuric, nitric, phosphoric, benzene sulfonic acid, trichloroacetic acid, trifluoroacetic acid, and the like.

The product obtained in Examples 1 and 2 can be used as an intermediate in making esters for use as plasticizers as shown in the following example.

Example 3

A solution mixture consisting of 55 g. of the final product from Example 1, 390 ml. of n-butyl alcohol, 300 ml. of benzene, and 5 ml. of 50% $H_2SO_4$ was heated at the boiling point for 22 hours and the benzene-water azeotrope cooled and separated before returning the benzene to the reaction mixture. The solution of the ester was washed with water, then with sodium bicarbonate solution, and again with water. The benzene solution of the ester (tetrabutyl cyclopentane-2,3,5-tricarboxy-1-acetate) was then distilled under atmospheric pressure until the benzene and most of the butyl alcohol had been removed. The remaining butyl alcohol was removed by distillation in vacuo. Upon testing this ester as a plasticizer for poly(vinylchloride) resin using conventional procedures, compositions having excellent physical properties were obtained.

The ester can also be used as a lubricant for internal combustion engines and the like.

Example 4

A 200 ml. acetic acid solution of 43.0 g. of dicyclopentadiene was fed onto the eighth plate of a 15 plate countercurrent sieve plate column. An ozone-oxygen stream (see below) was introduced at the bottom of the column. Approximately 600 ml. of acetic acid was added to the top of the column. The reaction column was cooled by tap water passing through an external jacket. The reaction was followed by recording the temperatures of the 3rd, 5th, 7th, 9th, 11th, and 13th plates (from the bottom) by the use of thermocouples. The bulk of the reaction occurred between the 5th and 11th plates. The temperature ranged from 16° C. at the extremities to 23° C. at the center of the column. A laboratory ozonator operating at 124 v. and using tap water cooling was used. An oxygen flow of 0.16 c.f.m. gave 0.15 g. of ozone per minute. The reaction took place during 225 minutes, and 108% ozone (of theory, based on the above equation) was passed into the column. Dense white fumes issued from the top of the column during the reaction.

The ozonized product was oxidized in a two-liter, three-neck flask equipped with a mechanical stirrer, reflux condenser, dropping funnel and thermometer. A solution of 51 ml. of 50% hydrogen peroxide, 121 ml. of water and 7.6 ml. of concentrated sulfuric acid was added. The solution was warmed to 55° C. and then cooling was necessary as the exothermic reaction started. The following day it was warmed to 60° C. On removal of the heat, the temperature spontaneously rose to 100° C. After two hours, the solution was cooled to 55° to 60° C. and maintained there for approximately 4 hours. The next day a trace of ferrous sulfate (a catalyst for destroying active oxygen) was added and the solution heated at 100° C. until no active oxygen remained in the solution. If desired, sulfate ions can be removed with ion exchange resin and then the solution evaporated to near-dryness in a vacuum evaporator, leaving a light-colored syrupy residue of the crude acid product.

Example 5

A solution of 3.59 g. of dicyclopentadiene was treated with ozone by the procedure of Example 2 in a mixture of 20 ml. of caproic acid and 20 ml. of pelargonic acid. The temperature was initially maintained at 10° C. As the reaction progressed the viscosity of the solution increased rapidly. It was necessary to allow the temperature to rise in order to get good contact between the liquid and gas phases. The solution was maintained at 45° C. for the final portion of the reaction. Approximately 110% of theory of $O_3$ was absorbed before an appreciable amount of ozone passed through unreacted.

For the oxidation, 11 ml. of 50% hydrogen peroxide, 10 ml. of water and 0.5 ml. of trifluoroacetic acid was used. The solution was slowly heated to reflux at 103° C. The solution was refluxed for 15 hours, and was then allowed to cool. (At this point it gave a negative test for active oxygen.) The water layer separated from the organic layer. The organic phase was extracted with two 25 ml. portions of water. Vacuum evaporation of the water phase yielded 3.86 g. (55% yield) of a clear, glassy, slightly yellow residue of the tetrabasic acid product.

Example 6

A two-liter, three-neck flask equipped with a mechanical stirrer, gas inlet tube, gas outlet and thermometer was used for the ozone reaction. A solution containing 21.4 g. of dicyclopentadiene in 100 ml. of ethyl acetate was placed in the flask. Then 40 ml. of ethyl acetate and 280 ml. of formic acid were added. The temperature was maintained between 25° to 30° C. during the reaction. Approximately 105% ozone (of theory) was passed into the reaction vessel.

For the oxidation 67 ml. of water and 60 ml. of 50% hydrogen peroxide were added. On warming to 55° C. the temperature rose spontaneously to 81° C. Cooling then was applied. After the exothermic reaction was completed, the solution was slowly heated to 96° C. during a period of 2 hours and 20 minutes. At the end of this treatment, no active oxygen remained. The solution was vacuum evaporated at 85° C., and 33.4 g. (79% yield) of crude tetrabasic products as a reddish syrup remained.

Example 7

A methyl ester was prepared by refluxing a solution of 55 g. of crude 2,3,5-tricarboxycyclopentaneacetic acid, 350 ml. of methanol, 300 ml. of ethylene chloride and 10 ml. of concentrated $H_2SO_4$. Refluxing was discontinued after 22 hours. The refluxed solution was washed with water, then with sodium bicarbonate solution and again with water. The ester was thereafter separated from the water layer and dried by heating to 60° C. A yield of 31 g. (38% of theory) with a boiling range of 160° to 165° C. at 1 mm. and a saponification equivalent of 81 (theory 79) was obtained. A known control sample with a theoretical value of 88 gave a saponification equivalent of 90.7 under the same saponification conditions. Other methods for recovering the tetramethyl ester after the washing steps well-known in the art include distillation in a plasticizer still.

Example 8

One-half the residue of crude acid product from Example 4 was dissolved in methanol. A methyl ester was prepared by refluxing a solution of said dissolved crude tetraacid product along with 125 ml. methanol, 200 ml. of dimethyl sulfite, and 1 ml. of concentrated hydrochloric acid. Reflux was continued for 4 hours. Thereafter in order to remove the sulfuric acid carried over from the oxidation step in Example 4, the solution was washed with water, followed by a wash with sodium bicarbonate and in turn rewashed with water. Evaporation of the solvent and distillation yielded 29.95 g. (58.2% yield) of tetramethyl ester, boiling from 165° to 170° C. (0.8 mm. to 1 mm.) and having a saponification equivalent of 81.4 (theory 79.0).

We claim:

1. The process of producing 2,3,5-tricarboxycyclopentaneacetic acid which comprises subjecting dicyclopentadiene to the action of ozone in a medium comprising a carboxylic acid to form an ozonized product at a reaction temperature in the range of 10° to 45° C. wherein the dicyclopentadiene:ozone mole ratio is 1:about 2 and thereafter oxidizing the ozonized product with hydrogen peroxide in the presence of an acid having an ionization constant at least as great as that of formic acid.

2. The process according to claim 1 wherein the dicyclopentadiene:hydrogen peroxide mole ratio is 1:2 to 7.

3. The process according to claim 1 wherein the medium comprises acetic acid.

4. The process according to claim 1 wherein the carboxylic acid medium comprises a mixture of caproic acid and pelargonic acid.

5. The process according to claim 1 wherein the medium comprises ethyl acetate and formic acid.

6. The process according to claim 1 wherein the oxidation is performed under reflux conditions.

7. The process according to claim 1 wherein the oxidation is performed at a temperature in the range of 50°–103° C.

8. The process of producing 2,3,5-tricarboxycyclopentaneacetic acid which comprises subjecting an acetic acid solution of dicyclopentadiene to the action of ozone at a reaction temperature of about 20° C. to form an ozonized product wherein the dicyclopentadiene:ozone mole ratio is 1:2, and thereafter oxidizing the thus-ozonized product under reflux conditions with hydrogen peroxide in the presence of sulfuric acid.

9. The method of preparing tricarboxycyclopentane acetic acid comprising contacting countercurrently dicyclopentadiene in glacial acetic acid with a vapor mixture of ozone in oxygen in a dicyclopentadiene:acetic acid:ozone mole ratio of 1:50:2 at a temperature in the range of 14–24° C. to form dicyclopentadiene ozonide; oxidizing the ozonide to tricarboxycyclopentane acetic acid with a solution consisting of 50% aqueous hydrogen peroxide, sulfuric acid, and water in the responsive liquid volume ratio of 50:10:150, and recovering the thus formed tricarboxycyclopentane acetic acid.

References Cited in the file of this patent

Henne et al.: Jour. Amer. Chem. Soc., vol. 65 (1943), pages 752–754.

Karrer: Organic Chemistry, 4th Ed. (1950), pages 159 and 504.

Holloway et al.: Industrial and Engineering Chemistry, vol. 47, No. 10 (1955), pages 2111–2113.

UNITED STATES PATENT OFFICE
CERTIFICATE OF CORRECTION

Patent No. 3,023,233                                February 27, 1962

Allison Maggiolo et al.

It is hereby certified that error appears in the above numbered patent requiring correction and that the said Letters Patent should read as corrected below.

Column 6, line 22, for "responsive" read -- respective --.

Signed and sealed this 19th day of June 1962.

(SEAL)
Attest:

ERNEST W. SWIDER
Attesting Officer

DAVID L. LADD
Commissioner of Patents